Figure 1:
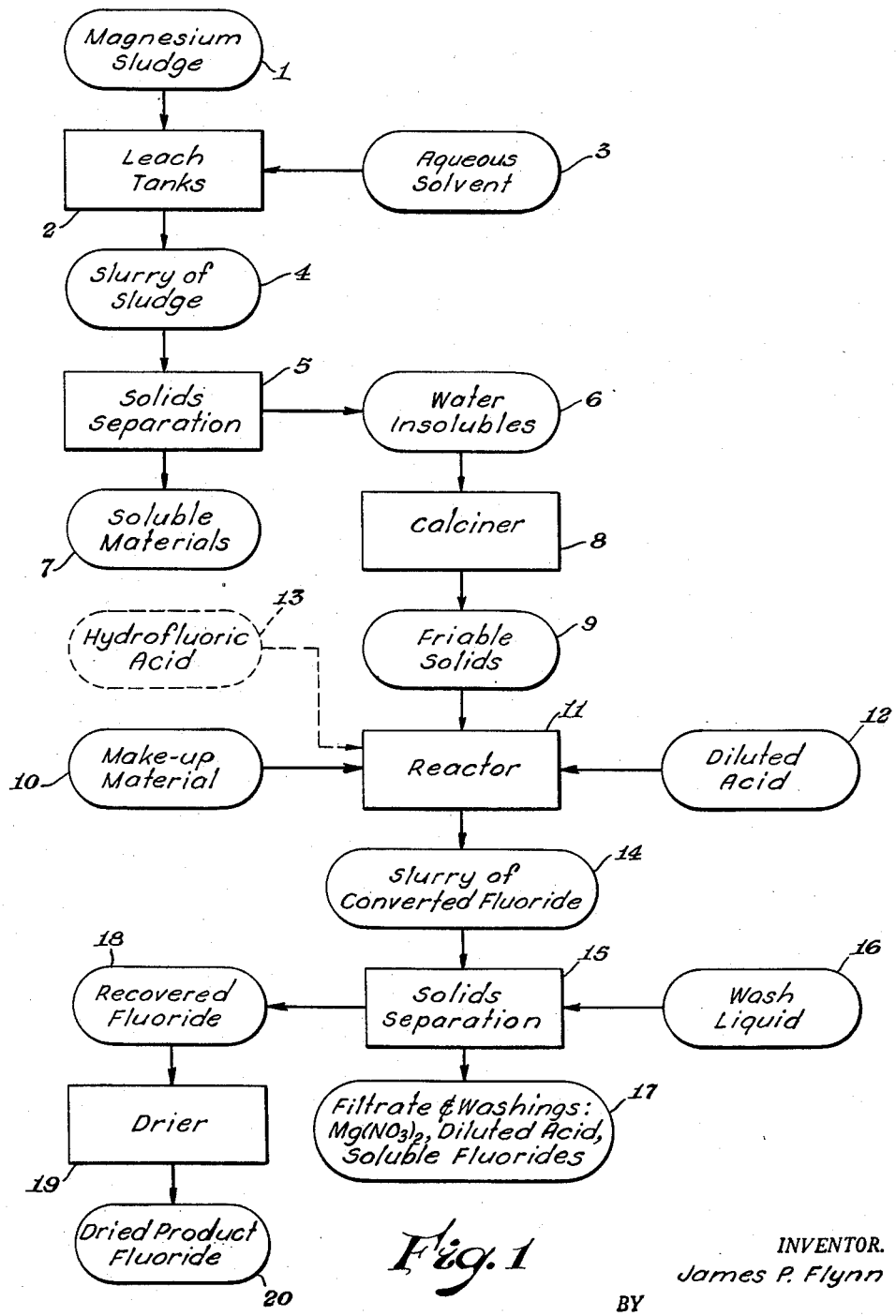

INVENTOR.
James P. Flynn

United States Patent Office 2,932,555
Patented Apr. 12, 1960

2,932,555

RECOVERY OF THORIUM AND RARE EARTHS FROM METALLURGICAL SLUDGES

James P. Flynn, Midland, Mich., assignor to The Dow Chemical Company, Midland, Mich., a corporation of Delaware Application October 4, 1957, Serial No. 688,338

12 Claims. (Cl. 23—14.5)

This invention relates to a process for the recovery of thorium and rare earth values from metallurgical sludges. It relates more particularly to a process for the recovery of thorium and rare earth values as fluorides from saline sludges generated during the production of alloys of magnesium and thorium or alloys of magnesium and one or more metals of the rare earths in the presence of flux.

In the production of alloys of magnesium with a metal of the group comprising thorium and the rare earth metals, hereinafter referred to as the alloying element, by reacting an appropriate reducible compound of the alloying element (here the fluoride) with molten magnesium under a protective saline flux, such as mixtures of alkali and alkaline earth halides, e.g., typically, 28 parts by weight of $CaCl_2$, 57 parts of KCl, 12.5 parts of $BaCl_2$ and 2.5 parts of $CaF_2$, alloying efficiency is in nearly all cases substantially less than 100 percent, i.e., only part of the available alloying element becomes alloyed, the remainder sinking to the bottom of the melt as part of the saline sludge formed as by-products of atmospheric attack and impurities which enter the flux. The saline sludge contains mainly magnesium fluoride, the oxide of the alloying element and entrapped particles of both alloy and free metals in addition to alkali and alkaline earth halides from the flux. The sludge cannot be used directly for further magnesium alloy production because the oxides of thorium and the rare earths formed under the above conditions are not readily reduced by molten magnesium.

It is accordingly an object of this invention to provide an economical method for the efficient recovery of the alloying elements thorium and rare earth metals from saline magnesium sludges containing these metals.

Another object of the invention is to provide a method for the recovery of the alloying elements thorium and rare earth metals from saline magnesium sludges in a form suitable for use in the preparation of alloys.

An additional object of this invention is to provide a method inherently sufficiently adequate for recovering any of the aforesaid alloying elements from saline magnesium sludges as the fluoride in substantially pure form except for water content.

Other objects and advantages of this invention will become apparent to those skilled in the art upon becoming familiar with the following description.

Various recovery methods have been tried. Physical methods of processing the finely ground sludges involved gave almost no separation of magnesium fluoride and the oxide of the alloying element. Chemical methods used were tedious and not economical because of the many steps required. The refractory nature, toward most acid solvents, of magnesium fluoride and the oxides of the alloying elements in the sludge has contributed to difficulties in the past.

One chemical method tried in the recovery of thorium involved leaching the sludge with dilute hydrochloric acid, filtering and treating the resulting insoluble residue with either concentrated sulfuric acid or aqua regia and again filtering. The residue obtained from the acid treatment was discarded and the two acid filtrates were combined and neutralized to a slightly acid pH with sodium hydroxide. The thorium hydroxide so precipitated was filtered off and redissolved with dilute hydrochloric acid. Thorium was precipitated from the so obtained hydrochloric acid solution by the addition of hydrofluoric acid at 90° C. The hydrated thorium fluoride thus produced was separated by filtration.

Neodymium has been recovered from magnesium sludges in a similar manner.

In U.S. Patent 2,546,933 is described a method of dissolving thorium values by which thorium and its compounds are taken up in a solvent comprising nitric acid containing a small amount of a fluorine-containing compound. The method is not applicable to the recovery of thorium or rare earths from magnesium sludges which contain substantial amounts of magnesium fluoride. It is intended for use with a relatively fluoride-free matrix. In the above patented procedure thorium is obtained as a nitrate solution containing, in addition to thorium nitrate, any portion of the matrix soluble in the acid medium. Thus additional steps would be required for the subsequent separation of thorium or of a rare earth metal from dissolved substances in the acid solution.

The present invention is based upon the discovery that upon prolonged digestion of saline magnesium sludges at an elevated temperature in dilute nitric acid, hydrochloric acid, or hydrobromic acid to which has been added a sufficient amount of either the oxide of the alloying element or magnesium fluoride as the case may be, referred to herein as deficient material, to maintain stoichiometric proportions in accordance with one of the following equations

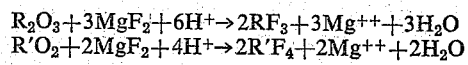

$$R_2O_3 + 3MgF_2 + 6H^+ \rightarrow 2RF_3 + 3Mg^{++} + 3H_2O$$
$$R'O_2 + 2MgF_2 + 4H^+ \rightarrow 2R'F_4 + 2Mg^{++} + 2H_2O$$

where R and R' are alloying elements of the group described

R is a metal of valence 3
R' is a metal of valence 4 magnesium compounds are brought into solution and the fluoride of the alloying element is precipitated. In this manner the alloying element is separated from the other components of the matrix.

My invention differs from the prior art in that the large amount of fluorine-containing material already present is efficiently utilized in the recovery of thorium or rare earth fluoride from saline magnesium sludges. After preliminary leaching and calcining a one-step conversion of refractory thorium or rare earth oxide to the corresponding desirable fluoride is achieved, eliminating the necessity of going through tedious and expensive dissolutions and precipitations.

The invention then consists of the process herein described and particularly pointed out in the claims, reference being had to the accompanying drawings.

Figure 2:
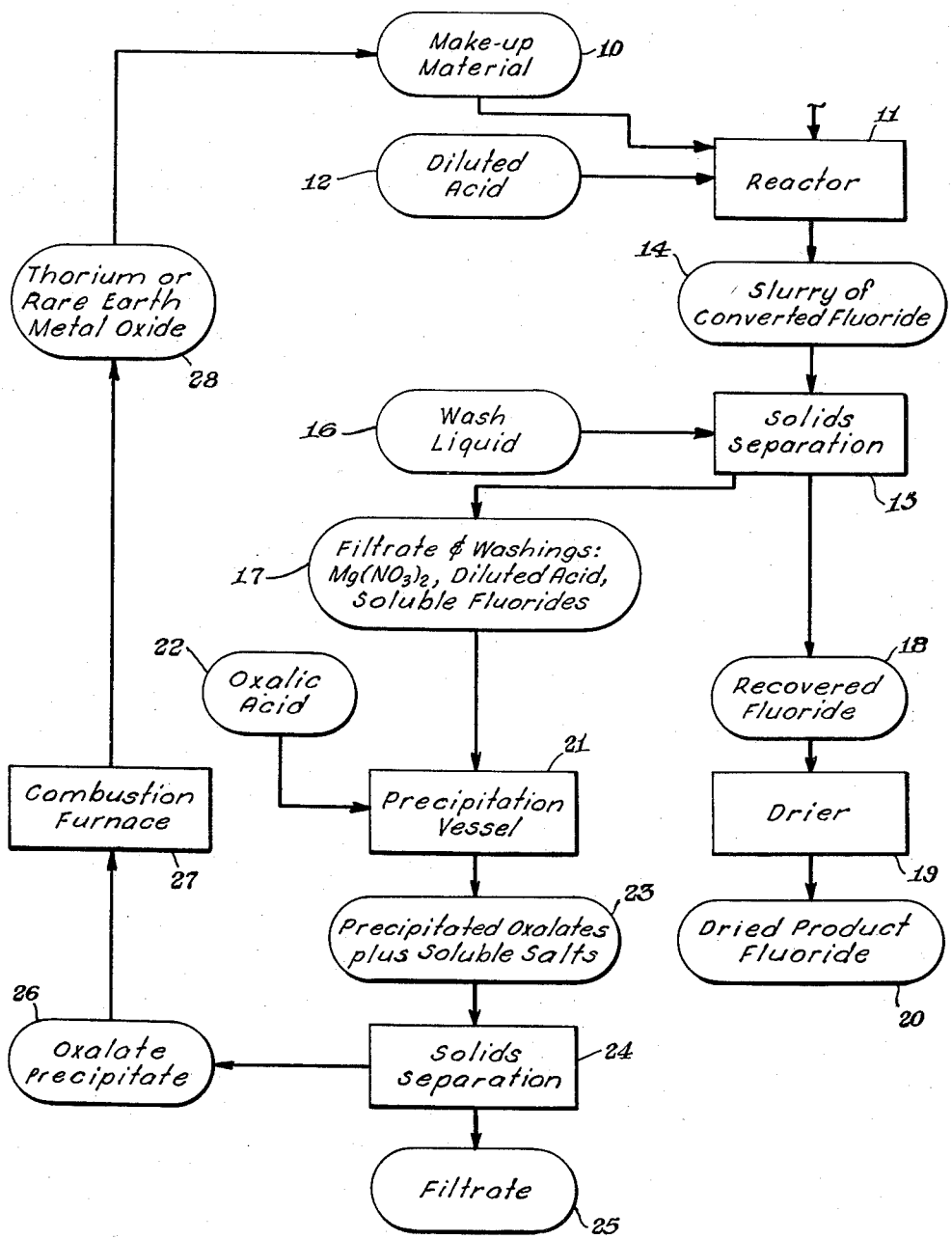

Figure 1 is a schematic diagram illustrating a combination of steps in the preferred mode of carrying out the invention. Fig. 2 is a partial schematic diagram, beginning with the acid digestion step, illustrating another embodiment of the invention.

Typical magnesium sludges to be treated in accordance with this invention contain 10 to 40 percent of thorium or rare earth oxide, 5 to 20 percent of elemental thorium or rare earth as magnesium base alloy and free metal and 15 to 40 percent of magnesium fluoride, the balance being essentially salts from the flux, elemental magnesium and magnesium oxide.

The usual sludge contains magnesium fluoride, and hence fluoride ion, in excess of that theoretically required to precipitate the fluoride of the alloying element. Sufficient make-up oxide, or hydroxide, of the alloying element must therefore be added to allow dissolution of this excess magnesium fluoride which will otherwise remain to contaminate the recovered product.

A 90 to 95 percent pure product containing, as the main impurity, magnesium fluoride, is readily obtained in accordance with the invention upon prolonged acid digestion of stoichiometric proportions of the oxide of the alloying element and magnesium fluoride. The presence of a small amount of magnesium fluoride does not adversely affect alloying efficiency and therefore does not prevent this product from being quite satisfactory for the preparation of alloys. However this product should not be considered limited to this use.

If the above acid digestion is continued for a sufficiently longer period to dissolve the remaining more refractory magnesium fluoride, the fluoride of the alloying element is obtained in good purity. This procedure may be further modified in order to obtain a substantially pure fluoride product. Make-up oxide of the alloying element in excess of stoichiometric proportions is added to the acid digestion mixture to promote dissolution of all the magnesium fluoride. After dissolution of the magnesium fluoride is complete, as determined by chemical analysis, the excess of the alloying element, now present in solution, is precipitated by the addition of a requisite quantity of hydrofluoric acid.

In carrying out the invention, reference being had to Figure 1, magnesium sludge 1 is leached 2 with water 3 to dissolve readily soluble salts and break down the mass into a slurry 4. A filtration or decantation step 5 serves to separate the undissolved solids 6 from soluble salts in solution 7.

Water leaching is generally completed in about two days. Agitation of the mass speeds up the leaching process. Acid leaching of the original sludge would serve to break down the mass more quickly than water leaching but would have several disadvantages if carried out as the first stage of the process. Part of the acid would be consumed by reaction with free metals in the sludge. A substantial part of the metallic alloying element present would be leached with the acid, enter solution, and be lost in the leach liquor.

To eliminate such problems from the acid digestion step the water leached sludge is dried and calcined 8. Temperatures in the range 600–800° C. are effective without at the same time causing decomposition of magnesium fluoride. The calcined material 9 then consists of magnesium fluoride, magnesium oxide, the oxide of the alloying element, and salts not removed by water leaching, all reduced to a friable powder which is preferably blended and then sampled for chemical analysis. Results of the analysis are used to calculate the requisite amount of make-up material 10 (generally the oxide of the alloying element) to add during acid digestion in the reactor 11. Acid digestion is carried out in nitric acid, hydrochloric acid or hydrobromic acid 12 added in such amount that the acid concentration in the solution upon completion of the digestion is about 0.5 molar, although other concentrations may be used.

The quantity of acid required for the digestion process is the sum of the acid required to react with the basic components of the saline sludge, and with the make-up oxide, plus the amount necessary to give the desired final acidity. Optimum results are obtained with a final hydrogen ion concentration between 0.5 and 2 molar. The digestion will proceed at acid concentrations between 0.1 and 6 molar, but above 6 molar acidity the process is very slow.

The volume to which the acid medium is diluted must be such that the magnesium salt of that same acid will not precipitate out of solution on cooling. In practice, the use of one liter of dilute acid per 250 grams of leached, calcined saline sludge has been satisfactory.

Nitric acid acts much more rapidly on thorium compounds than hydrochloric acid or hydrobromic acid. Hydrochloric acid and hydrobromic acid though slower, are adequate for the conversion of rare earths. Acid digestion is accomplished at a gentle reflux temperature (105 to 112° C.) in a period of 10 to 90 hours during which time magnesium fluoride gradually dissolves and the fluoride of the alloying element precipitates. At this point, addition of hydrofluoric acid or hydrogen fluoride 13 to the supernatant solution will cause precipitation of alloying element present either as an excess of the make-up addition or as a slightly soluble fluoride, e.g., a rare earth fluoride. Since thorium fluoride is relatively insoluble, the loss of thorium would be negligible if the hydrofluoric acid addition were omitted unless an excess of make-up thorium oxide had been added. There is indicated in the drawing, by broken lines, that the addition of hydrofluoric acid to the reactor is an alternative procedure.

After the acid digestion period, the solids 14, comprising mainly or entirely the precipitated converted fluoride, are separated from the solution by suitable means 15, such as counter-current decantation or filtration, and washed 16 free of soluble magnesium salts 17 with dilute hydrochloric acid, e.g., 5 percent HCl, or water. Dilute hydrochloric acid is to be preferred since it prevents peptization of the precipitate. Dilute nitric acid would serve the same purpose but residual nitrate ion is undesirable if the product is to be used to make an alloy. Recovered fluoride 18 is dried 19 at 110 to 250° C. depending on the desired end use of the dried product 20. If the product must be nearly anhydrous, it is advantageously dried at 200 to 250° C.

Referring now to Figure 2, a combination of steps, beginning with the acid digestion in the reactor 11, is shown to illustrate another mode of practicing the invention in which the soluble portion of the fluoride of the alloying element is recovered from the digestion slurry in a different manner. At the end of the digestion period, the precipitated fluoride is separated from the supernatant solution 14 by suitable means such as decantation or filtration 15, and washed with dilute hydrochloric acid or water 16. This recovered fluoride 18 is then put through a drier 19 to obtain a dried product fluoride 20 as before. The combined filtrate and acid washings 17 containing dissolved fluoride of the alloying element, soluble magnesium salts and dilute mineral acid is treated with oxalic acid in a precipitation vessel 21 for the purpose of precipitating the oxalate of the alloying element. The precipitate in the mixture 23 is separated from it by suitable means 24 such as filtration. The filtrate 25 may be discarded or put through a mineral acid recovery step as desired. The oxalate precipitate 26 is dried and ignited to the oxide 28 in a combustion furnace 27. The oxide is then recycled as make-up material 10 which is added to the reactor 11 to maintain stoichiometric proportions between magnesium fluoride and the oxide of the alloying element.

The following two examples are illustrative of the practice of the invention in the recovery of thorium from identical portions of the same calcined, leached saline sludge prepared as follows: A quantity of saline magnesium sludge formed during the production of magnesium-thorium alloys and containing thorium as the oxide and as entrapped metal pellets was leached with water and calcined for 20 hours at 600° C. The so treated sludge contained 27.7 percent Th, 31.8 percent Mg and 14.7 percent F. An impure grade of ThO$_2$ containing 80.4 percent Th and 1.7 percent Fe$_2$O$_3$ was used for make-up additions of deficient material for the conversion process.

*Example I*

256.4 ml. water was transferred to a one-liter three-necked flask fitted with a water cooled condenser, a mechanical stirrer and a heating mantle. Stirring was started and a 77.8 gm. portion of the calcined, leached saline sludge, described above, and 15.1 gm. of $ThO_2$, also described above, were slurried into the water. The total $ThO_2$ present was calculated to be 96.6 percent of the stoichiometric amount for reaction with the $MgF_2$ present. The system was closed and 143.6 ml. concentrated $HNO_3$ was added slowly through the condenser. Digestion of the resulting mixture was carried out at a steady reflux rate of 3 to 5 ml. per minute for 48 hours, the acid concentration then being 0.46 molar. Solids were separated from the supernatant solution of the digestion product in a centrifuge, then transferred to a fritted glass Büchner funnel and washed with 30 percent $HNO_3$, then sucked dry on the filter. 0.7 gm. dissolved Th remained in the filtrate. After oven-drying at 120° C. the so washed solid material weighed 48.6 gm. and contained 2.37 gm. $MgF_2$ and 32.2 gm. Th representing a thorium recovery efficiency of 96 percent. Further oven drying of the recovered fluoride at 250° C. increased $ThF_4$ content from 87.7 to 92.5 percent.

Example II 212.3 ml. water was transferred to a one-liter three-necked flask fitted with a water cooled condenser, a mechanical stirrer and a heating mantle. Stirring was started and a 77.8 gm. portion of the same calcined, leached saline sludge treated in Example I and described above and a 25.1 gm. portion of $ThO_2$, also described above, were slurried into the water. The system was closed and 187.7 ml. concentrated $HNO_3$ was added slowly through the condenser. Digestion was carried out at a steady reflux rate of 3 to 5 ml. per minute for 94.2 hours. The final acid concentration was 1.76 molar. Solids were separated from the supernatant solution of the digestion product in a centrifuge then transferred to a fritted glass Büchner funnel and washed with 30 percent $HNO_3$, then sucked dry on the filter. The filtrate contained 7.1 gm. Th. After oven-drying at 120° C. the so washed solid material weighed 53.5 gm. and contained 1.87 gm. $MgF_2$ and 33.5 gm. Th. Further oven drying of the solid material at 250° C. increased the $ThF_4$ content from 83 to 95.5 percent. Recovery of 7.0 gm. Th from the filtrate as the fluoride by addition of hydrofluoric acid in 10 percent excess of stoichiometric proportion brings the efficiency of thorium recovery to 97 percent.

The following example of the conversion reaction performed without the addition of make-up oxide serves as a comparison with the practice of this invention as shown above in Examples I and II.

Example III 600 ml. water and 200 ml. concentrated $HNO_3$ were transferred to a one-liter three-necked flask fitted with a water cooled condenser, a mechanical stirrer and a heating mantle. Stirring was started and a 77.8 gm. portion of the same calcined, leached saline sludge treated in Examples I and II and described above was transferred slowly to the flask. The acid digestion was carried out at a steady reflux rate of 3 to 5 ml. per minute for 18 hours, the acid concentration then being 1.6 molar. The solid material of the digestion product was separated by filtration on a fritted glass Büchner funnel and washed with 30 percent $HNO_3$, then sucked dry on the filter. The filtrate contained 0.7 gm. Th. After oven-drying at 120° C. the solid material weighed 36.3 gm. and contained 7.56 gm. $MgF_2$ and 20.44 gm. Th. The Th content is equivalent to 74.8 percent $ThF_4$. The efficiency of thorium recovery is 95 percent.

The following two examples are illustrative of the change in composition of the insoluble phase as the acid digestion proceeds during the practice of the invention in the recovery of thorium. They show that a substantially pure product except for water content may be obtained by using a large excess of $ThO_2$ in the digestion step.

Example IV

A quantity of saline magnesium sludge formed during the production of magnesium-thorium alloys was treated in accordance with the invention. The sludge containing thorium as the oxide and as entrapped metal pellets was leached with water and calcined for 20 hours at 600° C. The calcined, leached sludge contained 24.6 percent Th, 23.8 percent Mg and 9.8 percent F. 74.5 lbs. of this material plug 29 lbs. make-up thorium oxide was digested at 105° C. with 10 gal. concentrated $HNO_3$ diluted with 41 gal. water. At the end of the digestion period the acid concentration was 0.4 molar. The insoluble phase varied in composition during the course of the reaction as shown by the data in the accompanying table. The total amount of thorium oxide present in the calcined, leached sludge and in added make-up oxide was calculated to be 96 percent in excess of the stoichiometric amount.

| Digestion Time, Hrs. | Insoluble Phase | | | |
|---|---|---|---|---|
| | Percent Mg | Percent Th | Percent $MgF_2$ (Calc.) | Percent $ThF_4$ (Calc.) |
| 3 | 17.5 | 28.1 | | |
| 12 | 13.9 | 41.7 | | |
| 28 | 2.82 | 68.0 | | |
| 47 | .32 | 69.9 | 0.82 | 92.8 |

Example V 60 lbs. of the same calcined and leached saline sludge, described in Example IV, plus 31 lbs. make-up $ThO_2$ was digested at 105° C. in 10 gal. $HNO_3$ plus 29 gal. water. The total thorium oxide present was calculated to be 135% in excess of the stoichiometric amount. At the end of the digestion period the acid concentration was 0.14 molar. The insoluble phase changed composition during the course of the digestion as shown by the data in the accompanying table.

| Digestion Time, Hrs. | Insoluble Phase | | | |
|---|---|---|---|---|
| | Percent Mg | Percent Th | Percent $MgF_2$ (Calc.) | Percent $ThF_4$ (Calc.) |
| 8 | 19.8 | 35.8 | | |
| 18 | 11.4 | 52.8 | | |
| 26 | 5.28 | 64.1 | | |
| 42 | 1.40 | 71.7 | | |
| 66 | 0.25 | 73.2 | 0.64 | 97.2 |

In Examples IV and V, 99 percent of the thorium remaining in solution is recovered as the fluoride by precipitation from combined filtrates upon the addition of hydrofluoric acid in 10 percent excess of stoichiometric proportions.

The following are two examples of the recovery of neodymium, a rare earth metal. Example VI is illustrative of the change in composition of the insoluble phase as the acid digestion proceeds during the practice of this invention. As a comparison Example VII illustrates the results obtained when no make-up neodymium oxide is added during the acid digestion step.

Example VI 1217 gm. of saline magnesium sludge formed during the production of magnesium-neodymium alloys was leached with 2 liters of water. After filtration and drying at 120° C. the insoluble material weighed 980 gm. A 500 gm. portion of this leached and dried material was calcined for 20 hours at 800° C. The calcined material weighed 398 gm. and contained 10.6 percent Nd, 36.6 percent Mg and 12.8 percent F.

120 gm. of the above calcined and leached sludge was combined with 40.5 gm. of neodymium oxide, to provide an amount of neodymium 18 percent in excess of the stoichiometric proportion, and digested with 525 ml. conc. HCl plus 225 ml. H₂O at 105° C. for 66 hrs. The final acid concentration was 0.3 molar. The resulting mixture was filtered. The insoluble phase so recovered was dried and found by chemical analysis to contain 68.5 percent Nd as the fluoride. (The calculated Nd content of $NdF_3 \cdot 0.5H_2$ is 68.6 percent.) Data in the table below show the progress of digestion of sludge in this example.

| Digestion Time, Hours | Insoluble Phase | |
|---|---|---|
| | Percent Mg | Percent Nd |
| 0.5 | 20.85 | 21.95 |
| 6.5 | 8.19 | 50.5 |
| 27 | 3.01 | 66.6 |
| 51 | 1.84 | 67.9 |
| 66 | nil | 68.5 |

*Example VII*

79.1 gm. of the same calcined and leached sludge described in Example VI was digested with 250 ml. conc. HCl plus 150 ml. H₂O for 22 hours at 105° C. The final acid concentration was 0.5 molar. The digested mixture was filtered. The insoluble phase so recovered weighed 15.5 gm. after washing and drying and contained 54.7 percent $MgF_2$ and 45.3 percent neodymium fluoride representing a recovery of 71.1 percent of the neodymium originally present in the calcined sludge. The neodymium not recovered in this step remained in the acid filtrate.

For complete recoveries neodymium remaining in the above acid filtrates, both as the slightly soluble fluoride and as excess make-up oxide brought into solution during acid digestion, must be precipitated and recovered. Neodymium fluoride is quantitatively precipitated by adding fluoride, e.g., as hydrofluoric acid, in 150 percent excess of the stoichiometric amount.

Among the advantages of the invention are the absence of costly neutralization steps as well as the elimination of the need for substantial amounts of relatively expensive hydrofluoric acid, efficient use being made of bound fluorine, already present, for the conversion of alloying element values to the insoluble fluoride. Also, the practice of the process is readily adapted to fit the economics of a given situation since the product in substantially pure form may be obtained with as high recovery efficiency as products of 85 percent purity.

What is claimed is:

1. A process for the recovery of an alloying element of the group consisting of thorium and the rare earth elements from a saline magnesium sludge as generated during the production of alloys of magnesium with said alloying element in the presence of a saline flux, said saline sludge containing magnesium fluoride and acid-soluble values of the alloying element, said process comprising leaching the said sludge with an aqueous solvent to remove soluble salts; separating the leached solids from the resulting leaching solution; calcining the separated leached solids; to the calcined leached solids adding material from the class consisting of magnesium fluoride and the oxide of the said alloying element in amount sufficient to maintain stoichiometric proportions between magnesium fluoride and the oxide of the alloying element in the calcined leached solids for the conversion of the oxide to the fluoride; digesting the mixture so obtained in a mineral acid of the group consisting of nitric, hydrochloric and hydrobromic acid at an elevated temperature so as to bring about said conversion; recovering and washing the precipitate from the resulting digestion mixture; and drying the said precipitate at a temperature in excess of 100° C., thereby recovering the fluoride of the alloying element.

2. A process as in claim 1 in which the alloying element is thorium and the mineral acid is nitric acid.

3. A process as in claim 2 in which the recovered thorium fluoride is subjected to drying at temperatures in the range 200 to 250° C.

4. A process as in claim 1 in which the alloying element is a rare earth metal and the mineral acid is hydrochloric acid.

5. A process for the recovery of an alloying element of the group consisting of thorium and the rare earth metals from a saline magnesium sludge as generated during the production of alloys of magnesium with said alloying element in the presence of a saline flux, said saline sludge containing magnesium fluoride and acid-soluble values of the alloying element, said process comprising leaching the said sludge with an aqueous solvent to remove soluble salts; separating the leached solids from the leaching solution; calcining the separated leached solids; to the calcined leached solids adding material from the class consisting of magnesium fluoride and the oxide of the said alloying element in amount sufficient to maintain a stoichiometric excess of oxide of the alloying element over magnesium fluoride to assure utilization of substantially all of the magnesium fluoride in the conversion of the said oxide to the fluoride; digesting in a diluted mineral acid selected from the group consisting of nitric, hydrochloric and hydrobromic acid, at an elevated temperature and mixture of deficient material and calcined product to bring about the said conversion of the oxide of the alloying element to the fluoride; adding the requisite amount of hydrofluoric acid to the supernatant phase of the resulting digestion liquor to precipitate dissolved alloying element as a fluoride precipitate; and recovering the precipitate thereby obtaining substantially pure fluoride of the alloying element.

6. A process as in claim 5 in which the alloying element is thorium and the mineral acid is nitric acid.

7. A process as in claim 5 in which the alloying element is a rare earth metal and the mineral acid is hydrochloric acid.

8. A process as in claim 5 in which the alloying element is a rare earth metal and the mineral acid is nitric acid.

9. A process for the recovery of an alloying element of the group consisting of thorium and the rare earth metals from a saline magnesium sludge as generated during the production of alloys of magnesium with said alloying element in the presence of a saline flux, said saline sludge containing magnesium fluoride and acid-soluble values of the alloying element, said process comprising leaching the said sludge with an aqueous solvent to remove soluble salts; separating the leached solids from the leaching solution; calcining the separated leached solids; to the calcined leached solids adding material from the class consisting of magnesium fluoride and the oxide of the said alloying element in amount sufficient to maintain a stoichiometric excess of oxide of the alloying element over magnesium fluoride to assure utilization of substantially all of the magnesium fluoride in the conversion of the said oxide to the fluoride; digesting the mixture so obtained in a mineral acid selected from the group consisting of nitric, hydrochloric and hydrobromic acid, at an elevated temperature to bring about the said conversion of the oxide of the alloying element to the fluoride; separating precipitated fluoride from the supernatant solution; then recovering dissolved alloying element from the supernatant solution by precipitating the alloying element as the oxalate; separating the precipitated oxalate from the solution; igniting the separated oxalate to the oxide; recycling the so obtained oxide in the process as make-up material; and drying the aforesaid precipitated fluoride at a temperature in excess of 100° C., thereby recovering substantially pure fluoride of the alloying element.

10. A process as in claim 9 in which the alloying element is a rare earth metal and the mineral acid is hydrochloric acid.

11. A process for the recovery of a rare earth metal from a saline magnesium sludge as generated during the production of alloys of magnesium with said rare earth metal in the presence of a saline flux, said saline sludge containing magnesium fluoride and acid soluble rare earth metal values, said process comprising leaching the said sludge with an aqueous solvent to remove soluble salts; separating the leached solids from the leaching solution; calcining the separated leached solids; to the calcined leached solids adding material from the class consisting of magnesium fluoride and the oxide of the said rare earth metal in amount sufficient to maintain stoichiometric proportions between magnesium fluoride and the oxide of the rare earth metal in the calcined leached solids for the conversion of the oxide to the fluoride; digesting the mixture so obtained in a mineral acid selected from the group consisting of nitric, hydrochloric and hydrobromic acid, at an elevated temperature so as to bring about said conversion; adding the requisite amount of hydrofluoric acid to the supernatant phase of the resulting digestion liquor to precipitate dissolved rare earth metal as additional fluoride precipitate; separating the combined precipitate from the supernatant solution; and drying the precipitate at a temperature in excess of 100° C.

12. A process for the recovery of a rare earth metal from a saline magnesium sludge as generated during the production of alloys of magnesium with said rare earth metal in the presence of a saline flux, said saline sludge containing magnesium fluoride and acid soluble rare earth metal values, said process comprising leaching the said sludge with an aqueous solvent to remove soluble salts; separating the leached solids from the leaching solution; calcining the separated leached solids; to the calcined leached solids adding material from the class consisting of magnesium fluoride and the oxide of the said rare earth metal in amount sufficient to maintain stoichiometric proportions between magnesium fluoride and the oxide of the rare earth metal in the calcined leached solids for the conversion of the oxide to the fluoride; digesting the mixture so obtained in a mineral acid selected from the group consisting of nitric, hydrochloric and hydrobromic acid, at an elevated temperature so as to bring about said conversion; separating precipitated fluoride from the supernatant phase of the resulting digestion liquor; then recovering soluble rare earth metal from the separated supernatant solution by precipitation as the oxalate; separating the precipitated oxalate from the solution; igniting the separated oxalate to the oxide; recycling the so obtained oxide in the process as make-up material; and drying the aforesaid precipitated fluoride at a temperature in excess of 100° C., thereby recovering dried rare earth fluoride.

References Cited in the file of this patent

UNITED STATES PATENTS 2,546,933     Steahly et al. _____ Mar. 27, 1951